Patented Apr. 10, 1945

2,373,614

UNITED STATES PATENT OFFICE 2,373,614

AQUEOUS DISPERSION

Andrew Szegvari, Fairlawn, and Adrian H. Feikert, Wadsworth, Ohio, assignors to American Anode, Inc., Akron, Ohio, a corporation of Delaware No Drawing. Original application March 23, 1940, Serial No. 325,652. Divided and this application July 4, 1944, Serial No. 543,488

14 Claims. (Cl. 260—4)

The invention relates to a method of treating a wide variety of fibrous materials including fibers in unfabricated as well as fabricated form in order to produce fibrous articles and products exhibiting to a high degree certain desired properties of long life, wear resistance and resistance to a variety of other factors and influences involved in the usual service of the various articles and products. The invention also contemplates the treated fibrous products obtained by practicing the method. More particularly, the invention involves the application to fibrous material of a coating deposit of the solids from an aqueous dispersion of polyisobutylene or similar material preferably in admixture with certain other materials for modifying the characteristics of the polyisobutylene. The invention is especially concerned with the treatment of fibrous materials with aqueous dispersions of certain tough, elastic and permanently resilient, high-molecular weight polymers of isobutylene and analogous olefins.

There are now available on the market in this country under the tradename "Vistanex" certain permanently resilient paraffinic materials prepared by polymerizing olefins of low molecular weight. Similar materials have also been sold under other trade-names including "Vispronal" and "Viskanol." Only meager information concerning these commercial products has been made public, but it is understood that they are prepared by polymerizing certain vapor fractions produced in cracking petroleum to make cracked gasoline. Thus, it appears that fractions containing considerable quantities of isobutylene possibly admixed with other olefins and iso-olefins of similar relatively low molecular weights may be polymerized under suitable conditions to produce a variety of polymers of much higher molecular weights. Apparently depending somewhat upon the particular method of polymerization employed, the polymers may consist practically entirely of polymerized isobutylene, or may consist principally of polymerized isobutylene in admixture, however, with some other polymerized olefins. It is also understood that other related olefins and iso-olefins may be polymerized in a similar manner to produce similar polymers. The polymers now being supplied commercially are believed to consist very largely of polymerized isobutylene.

Such polymers are produced with widely varying average molecular weights and correspondingly widely varying physical properties. The polymers in the lower range of average molecular weights extending from around 800 up to the region of average molecular weights of from 25,000 to 30,000 are liquid or liquid-like in nature. The higher polymers having average molecular weights in the range extending from the region of 25,000 to 30,000 up to 100,000 or 200,000 or even 500,000 are quite different in many physical properties and are permanently resilient solids as distinguished from the liquid and liquid-like polymers in the lower range of average molecular weights. In U. S. Patent No. 2,138,895 assigned to the manufacturers in this country of "Vistanex," the term "plastic" is applied to the lower range of liquid-like polymers while, in contradistinction, the term "elastic" is applied to the resilient polymers in the higher range of average molecular weights.

The liquid and liquid-like plastic polymers in the lower molecular weight range may be dispersed directly in water by commonly used methods of dispersing (emulsifying) insoluble liquid materials in water. On the contrary, it is difficult to prepare a satisfactory dispersion of the higher molecular weight polymers because of their permanently resilient and non-plastic nature. However, in certain other patent applications hereinafter identified, we have described methods by which the resilient solid polymers may be dispersed directly in water to produce excellent colloidal dispersions. Reference is here made to the other applications for details of the dispersing procedures but it may be noted that one of the preferred procedures involves the use of a conjunctive material such as a rubber (which is understood to include both natural and synthetic rubbers and rubber-type materials, including specifically natural crude rubber, rubbers in the form of latex and artificial dispersions, reclaimed rubbers, butadiene rubbers, and polychloroprene, as well as gutta percha and balata), ester gum, asphalt, rubber derivatives prepared by treating rubber with sulfonic acids, rubber degradation product obtained by dry distilling rubber and including both the volatile oils and the solid residues so produced, chlorinated diphenyl, chlorinated naphthalene, rosin, poly-ethylene dihalides such as the commercial product "A. X. F." and like materials. All these materials may themselves be artificially dispersed in water and all of them are compatible and capable of being homogeneously blended with the hydrocarbon polymerization products being dispersed. For the sake of brevity, they have been termed "conjunctive" materials as they are now believed to function at least in part to promote a union between the more inert polymerized solid hydrocarbon and the dispersing agents and/or to promote a proper phase relationship favorable to inversion. Such conjunctive materials are mixed with the resilient polymers and the mixture is dispersed so that the conjunctive material appears with the polymer in the dispersed solid particles. The polymer is present in the dispersed particles in a resilient solid state.

We have found that such dispersions of resilient, solid polyisobutylene and similar materials preferably in admixture with one or more conjunctive materials are especially useful for treating a wide variety of fibrous materials.

Such dispersions have been mixed in quantities varying from 3% to 50% with paper pulp to produce paper greatly improved in strength and flexibility as well as in resistance to water and chemicals. Somewhat similarly the dispersions have been mixed with comminuted leather fibers or cotton or other fibers and formed into a sheet and dried to make artificial leather surpassing prior products in resistance to water permeation, strength and flexibility.

Textile fabrics of various kinds have been water-proofed and gas-proofed with such dispersions of polyisobutylene. Balloon fabric impregnated with such a dispersion and dried exhibits exceptional strength and low permeability to gases. Leather goods in general, and conveyor and transmission belts of both leather and fabric, are improved by treatment with the dispersions.

A mass of glass wool in suitable form impregnated with such a dispersion of polyisobutylene provides an efficient filter for air-conditioning systems and especially for filtering corrosive liquids or gases. Woven glass textile tapes impregnated with the dispersions are especially useful for heat-resistant gaskets and as protective coatings for plating racks used in chromium and other plating baths. The dispersions are also valuable for treating clothing to be worn for protection against toxic gases and corrosive chemicals.

Emulsions or dispersions of the liquid-like polymers of isobutylene and also dispersions of the resilient polymers prepared without the use of conjunctive agents are satisfactory to some degree in practically all the foregoing applications, and, in some cases, are equally as satisfactory as the dispersions containing conjunctive materials. Generally, however, the dispersions of resilient solid polymers associated with conjunctive materials are definitely superior for treating fibrous materials and are preferred for most uses in that field.

Aqueous dispersions of polyisobutylene of the character described have thus far found their widest application in the treatment of women's silk and synthetic silk or rayon hosiery for the purpose of improving the life and wear characteristics of the hose. Many treatments for this purpose have been suggested from time to time, including treatments with rubber, with rubber derivatives, and with a variety of different natural and synthetic resins in many different forms and including an equally wide variety of processes and conditions for applying the treating materials to the hose. Insofar as applicants are aware, however, none of the many prior processes has been used commercially to any substantial extent. The reason is apparent. Silk hose and the like are quite sheer and flimsy and a satisfactory treatment should strengthen or reenforce the hose and the constituent yarns sufficiently to provide reasonably long life and, especially, to provide added resistance to snagging and resultant running or laddering of the knitted fabric. At the same time, the treatment must not stiffen the hose to any substantial degree, must not alter the natural silky feel unduly, and must not impart any undesirable odor to the hose nor impair their appearance. These requirements are to some extent seemingly mutually inconsistent and contradictory and no material or treating process has heretofore been suggested or devised which satisfactorily meets all the requirements. Resins generally tend to stiffen the hose and attempts at plasticization have not been effective in relieving such stiffness. Rubber, while sufficiently flexible, involves undesirable odors and surface characteristics imparting an undesirable feel to the hose. Other materials which have been proposed present similar undesirable features.

We have found that silk and other sheer hosiery may be treated with aqueous dispersions of the high molecular weight resilient, solid polymers of isobutylene, preferably in association with a conjunctive material of the character hereinabove described, and that the treated hose exhibit exceptional flexibility, excellent resistance to snagging, tearing, running and laddering, unusually long life, and good resistance to repeated washings. Also, the treated hose are satisfactorily free of objectionable odors and undesirable surface characteristics such as tackiness. It has further been found that especially satisfactory reenforcement and surface characteristics are obtained if the treating dispersion also contains a tack-destroying material of a resinous nature such as a phenolic resin, shellac, or a copolymer of butadiene and acrylic nitrile such as the commercial product "Perbunan." Such tack-destroying resins preferably are incorporated in the treating dispersion in quantities varying from 5% to 25% by weight.

The exceptionally satisfactory results obtained in treating silk hosiery according to the present invention appear to result in part from the modifying effects of added materials, especially the conjunctive materials and the tack-destroying materials, and in part from proper physical application of the treating material which involves a number of procedural details apparently contributing valuably to the successful end result. It accordingly appears that the invention may best be understood by considering a specific, detailed description of a preferred embodiment of the invention. The following detailed description is therefore to be taken as illustrative and not limitative of the invention.

Best results are attained if the hose are treated after they have been "boiled off" in the usual manufacturing procedure and before they are dyed, although satisfactory results may be obtained by treating dyed hose provided the dye used is of such nature that the present treatment will not spot, discolor or otherwise interfere with the dye. The "boiled off" but undyed hose are first imersed in a bath of introfying solution preferably containing at least one saponaceous material and an alkaline material. An especially satisfactory introfying solution may be prepared by adding to water the following quantities of materials for each gallon of water: 25 c. c. of 20% potassium oleate solution, 20 c. c. of a 15% solution of the commercial product known as "Immersol TX," 15 c. c. of the synthetic saponaceous material sold as "Aquarex D" and 5 c. c. of 28% ammonium hydroxide solution. The soaps and ammonium hydroxide, of course, may be replaced by other well-known soaps and alkaline materials or other introfiers. After about three minutes immersion, the hose are removed from the bath and excess introfying solution is removed as by centrifuging the hose for a few minutes. It should be noted here that many manufacturers treat "boiled off" hose with a neutral soap solution as a part of the regular manufacturing procedure. In treating such hose according to the present invention, the introfying solution treatment may be dispensed with in many cases as the neutral soap treatment has a similar although somewhat less efficient introfying effect. More uniform results are attained if the introfying treatment is employed whether or not the hose have been treated with soap or the like.

The prepared hose then are immersed in an aqueous dispersion of solid, resilient polyisobutylene prepared according to the method of our applications hereinafter identified and preferably containing a conjunctive material and a tack-destroying material as well as other incidental compounding materials. For example, a satisfactory treating dispersion may be prepared by admixing 100 parts by weight of "Vistanex High Molecular Weight" (a resilient solid polymer of isobutylene stated to have an average molecular weight of around 200,000) and 17 parts of premasticated crude Hevea rubber as a conjunctive material and dispersing the mixture according to the procedure described in our aforementioned applications. There is then preferably added to the dispersion as a tack-destroying material 15 parts by weight of a phenolic resin of the phenol-formaldehyde type such as the emulsifiable resin furnished by the General Plastics Company under the trade designation "Durez Resin" or other similar resin which may be dispersed or emulsified in water. The resin is preliminarily emulsified in water and added to the dispersion in emulsion form. The dispersion also should contain vulcanizing agents in sufficient quantities to vulcanize the rubber conjunctive material present, as well as an age-resistor for the rubber. Such materials may be added according to well-known rubber dispersion compounding practice. In the illustrative example, the vulcanizing agents may include 2 parts by weight of sulfur, 3.3 parts of organic accelerator of vulcanization, and 2 parts of zinc oxide. 0.4 part of a commercial age-resistor such as "AgeRite White" (sym. di beta naphthyl-p-phenylene diamine) also should be added. All such compounding materials are added as colloidal dispersions or emulsions according to usual practice. Also, the dispersion may contain added stabilizing agents such as 2.0 parts by weight of "phosphotex," a phosphate salt stabilizer. The treating dispersion may contain from 10% to 50% total solids by weight but preferably contains in the neighborhood of 20% to 25% total solids. In many instances, it will be desirable to replace the crude rubber conjunctive material of the foregoing example with polychloroprene or butadiene rubber or similar synthetic rubber or rubber-type material (all within the generic term "a rubber" and the corresponding plural term "rubbers" as herein employed and as previously indicated) in order to eliminate any trace of natural crude rubber odor and tackiness.

The hose are permitted to remain in the treating dispersion for about 30 seconds after which they are removed together with a considerable quantity of the dispersion in association with the hose in an uncoagulated condition. The hose are passed immediately through tight set rubber covered wringer rolls or otherwise pressed to express a substantial part of the associated dispersion, and the hose are then conveyed between forceful blasts of compressed air or the like to blow bridging films from the interstices of the hose fabric. It is important that the removal of the excess uncoagulated dispersion be effected before any substantial coagulation has occurred. Otherwise a non-uniform coating is produced. The treated hose then are mounted on conventional "boarding forms" and are dried for 5 minutes at 150° F. to effect coagulation of the dispersion on the fibers. If desired, the coagulation may be effected by placing the treated hose in a chamber filled with vapors of a coagulant such as formic acid or acetic acid. The coagulated rubber is then vulcanized by heating for 30 minutes at 220° F. Thereafter, the hose are washed in a 0.5% mild soap solution at 90° F. rinsed in fresh water, centrifuged and again dried. The hose are then dyed according to usual practices unless pre-dyed hose have been treated.

The individual yarns and fibers of the treated hose are covered with a coating which is of the order of only 5 microns in thickness (which is understood to include variations of from 3 to 10 microns unless otherwise indicated). Notwithstanding the extreme thinness of the coating, the life and wear characteristics of the hose are improved remarkably and none of the undesirable features of prior treatments are presented.

While the detailed procedure hereinabove described has been developed especially for treating silk, rayon, "nylon" and other sheer knitted hosiery, substantially the same procedure may be employed advantageously for treating a variety of textile and other fabric materials. Thus fabrics and other fibrous structures of wool, cotton, silk, glass and synthetic yarns or threads such as "nylon" and rayon may be treated effectively by the procedure described, or the treating dispersions may be simply spread, brushed, or transferred to the fibrous material by a transfer roll. Similarly, many of the features of the hosiery treatment may be applied advantageously to the treatment of the various fibrous materials described in the earlier paragraphs of this specification. All such applictaions and many variations in details of the procedures and materials described are within the spirit and scope of the invention as defined by the appended claims.

A part of the subject matter herein disclosed is claimed in our concurrently filed application Serial No. 543,489 filed July 4, 1944.

This application is a division of our co-pending application Serial No. 325,652 filed March 23, 1940, which was a continuation-in-part of our earlier co-pending application Serial No. 308,220 filed December 8, 1939 (now U. S. Patent No. 2,194,958 granted March 26, 1940) which, in turn, was a continuation-in-part of a co-pending application Serial No. 83,356, filed June 3, 1936.

We claim:

1. As a composition of matter, an aqueous dispersion containing substantial quantities of a resilient solid high molecular weight polymerization product having paraffinic characteristics prepared by polymerizing a mono-olefin of low molecular weight; shellac; and a rubber material selected from the class consisting of natural rubber, polychloroprene, reclaimed rubber, and butadiene synthetic rubber other than a copolymer of butadiene and acrylic nitrile; the polymerization product being one having an average molecular weight not less than substantially 30,000.

2. As a composition of matter, an aqueous dispersion containing substantial quantities of a resilient solid high molecular weight polymerization product having paraffinic characteristics prepared by polymerizing a mono-olefin of low molecular weight; shellac; and natural rubber; the polymerization product being one having an average molecular weight not less than substantially 30,000.

3. As a composition of matter, an aqueous dispersion containing substantial quantities of a resilient solid high molecular weight polymerization product having paraffinic characteristics prepared by polymerizing a mono-olefin of low molecular weight; shellac; and a butadiene synthetic rubber other than a copolymer of butadiene and acrylic nitrile; the polymerization product being one having an average molecular weight not less than substantially 30,000.

4. As a composition of matter, an aqueous dispersion containing substantial quantities of a resilient solid high molecular weight polymerization product having paraffinic characteristics prepared by polymerizing a mono-olefin of low molecular weight; shellac; and polychloroprene; the polymerization product being one having an average molecular weight not less than substantially 30,000.

5. As a composition of matter, an aqueous dispersion containing substantial quantities of shellac; a resilient solid high molecular weight polymer of isobutylene having an average molecular weight not less than substantially 30,000; and a rubber material selected from the class consisting of natural rubber, polychloroprene, reclaimed rubber and butadiene synthetic rubber other than a copolymer of butadiene and acrylic nitrile.

6. As a composition of matter, an aqueous dispersion containing substantial quantities of shellac; a resilient solid high molecular weight polymer of isobutylene having an average molecular weight not less than substantially 30,000; and natural rubber.

7. As a composition of matter, an aqueous dispersion containing substantial quantities of shellac; a resilient solid high molecular weight polymer of isobutylene having an average molecular weight not less than substantially 30,000; and a butadiene synthetic rubber other than a copolymer of butadiene and acrylic nitrile.

8. As a composition of matter, an aqueous dispersion containing substantial quantities of shellac; a resilient solid high molecular weight polymer of isobutylene having an average molecular weight not less than substantially 30,000; and polychloroprene.

9. As a composition of matter, an aqueous dispersion containing substantial quantities of shellac; a resilient solid high molecular weight polymer of isobutylene having an average molecular weight not less than substantially 100,000; and a rubber material selected from the class consisting of natural rubber, polychloroprene, reclaimed rubber and a butadiene synthetic rubber other than a copolymer of butadiene and acrylic nitrile.

10. As a composition of matter, an aqueous dispersion containing substantial quantities of shellac; a resilient solid high molecular weight polymer of isobutylene having an average molecular weight not less than substantially 100,000; and natural rubber.

11. As a composition of matter, an aqueous dispersion containing substantial quantities of shellac; a resilient solid high molecular weight polymer of isobutylene having an average molecular weight not less than substantially 100,000; and a butadiene synthetic rubber other than a copolymer of butadiene and acrylic nitrile.

12. As a composition of matter, an aqueous dispersion containing substantial quantities of shellac; a resilient solid high molecular weight polymer of isobutylene having an average molecular weight not less than substantially 100,000; and polychloroprene.

13. A composition comprising an aqueous dispersion containing substantial quantities of shellac and colloidally dispersed solid particles of a resilient solid polymer having an average molecular weight not less than substantially 30,000 prepared by polymerizing a material consisting principally of isobutylene.

14. A composition comprising an aqueous dispersion containing substantial quantities of a resilient solid high molecular weight polymer of isobutylene having an average molecular weight not less than substantially 100,000 present in colloidally dispersed particles, and shellac.

ANDREW SZEGVARI.
ADRIAN H. FEIKERT.